Aug. 22, 1944.  G. CROMPTON, JR  2,356,223
HONING MACHINE
Filed June 12, 1942  10 Sheets-Sheet 2

Inventor
George Crompton Jr

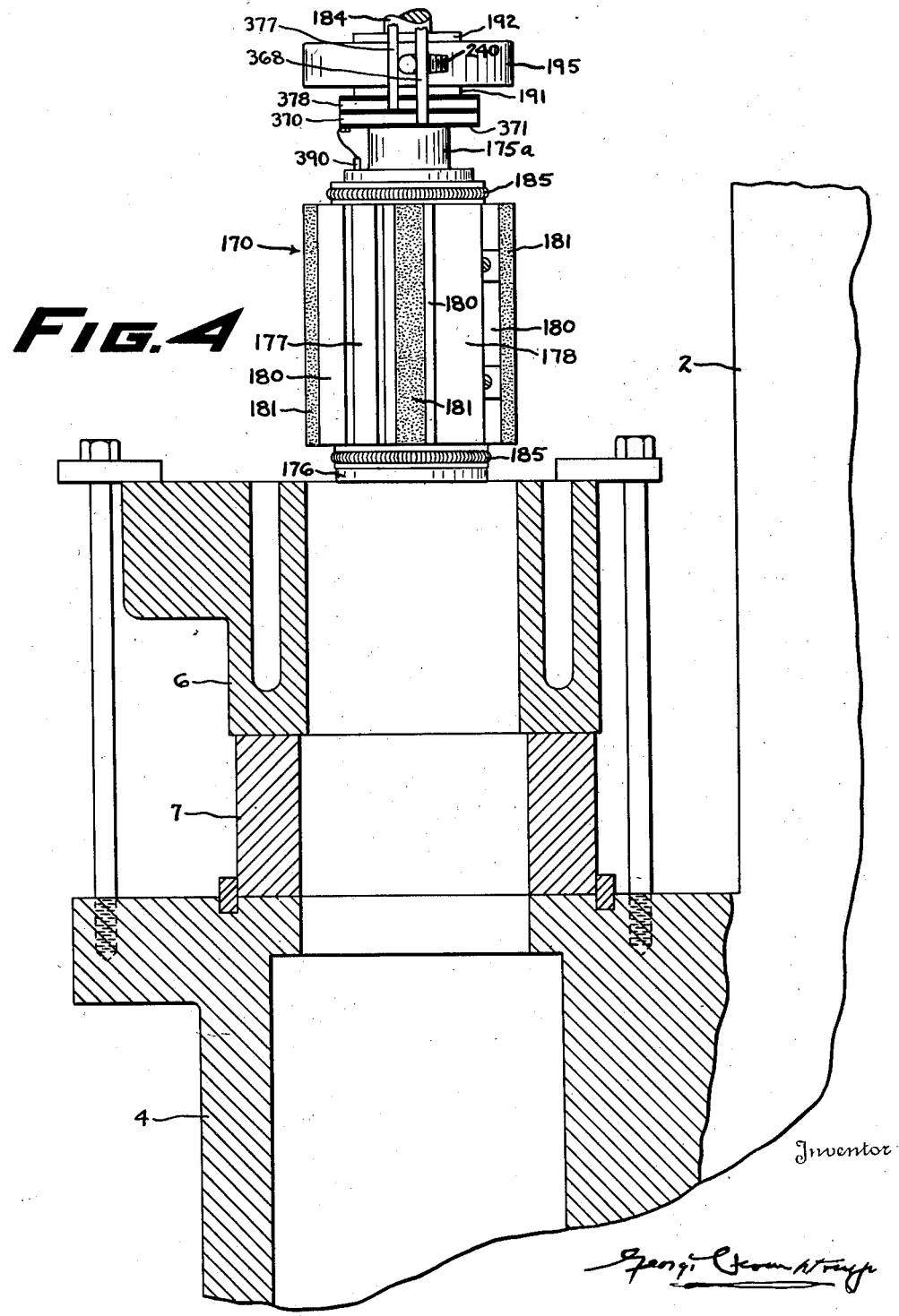

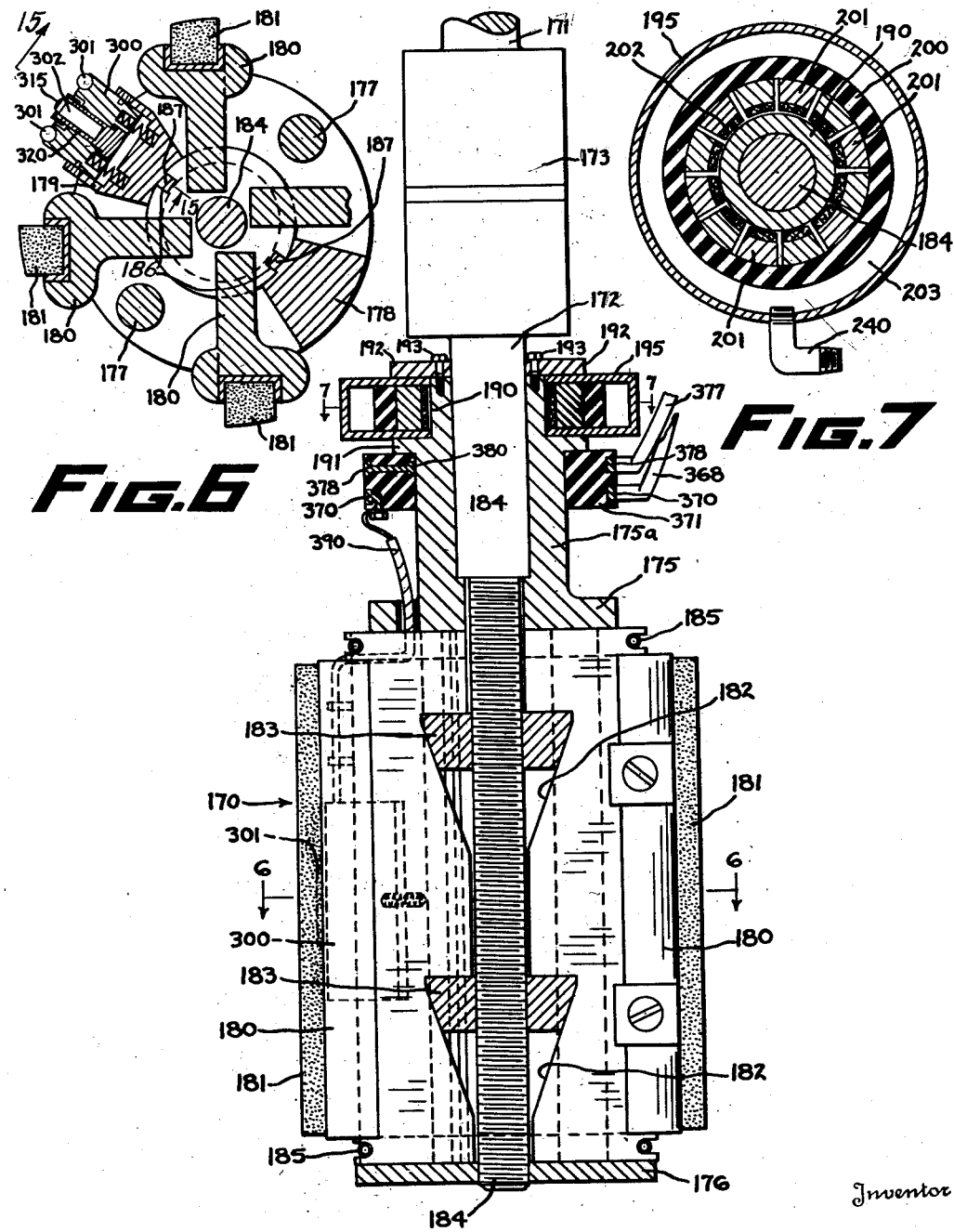

Aug. 22, 1944.   G. CROMPTON, JR   2,356,223
HONING MACHINE
Filed June 12, 1942   10 Sheets-Sheet 6

Inventor
George Crompton Jr

Aug. 22, 1944.   G. CROMPTON, JR   2,356,223
HONING MACHINE
Filed June 12, 1942   10 Sheets-Sheet 7
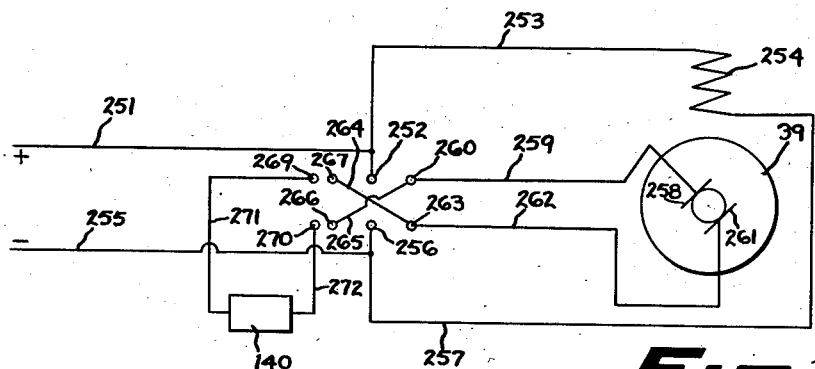
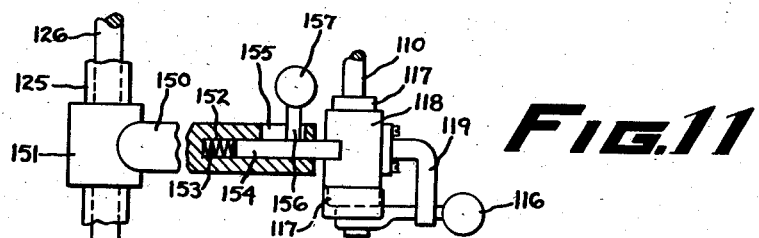
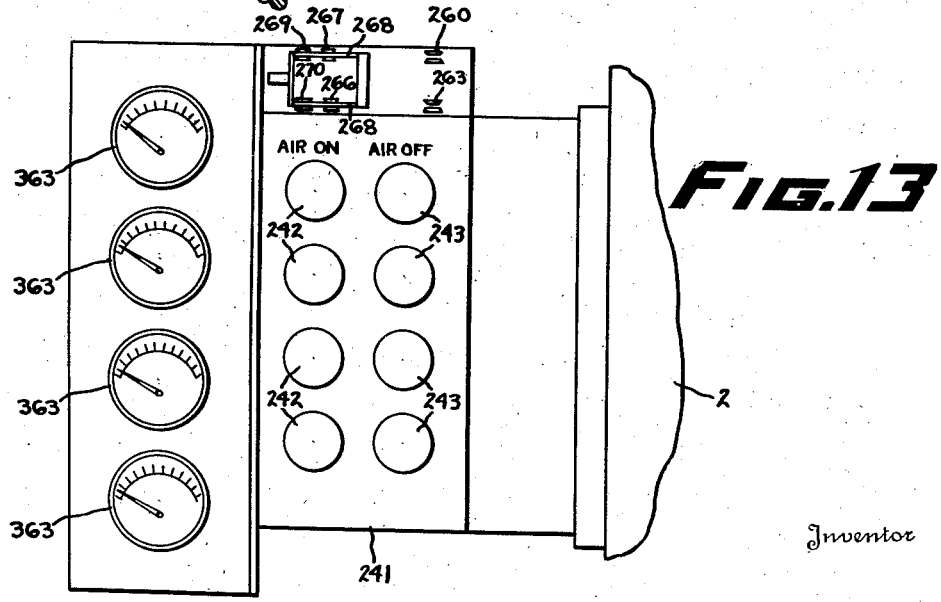
Inventor
George Crompton Jr.

Aug. 22, 1944.  G. CROMPTON, JR  2,356,223
HONING MACHINE
Filed June 12, 1942  10 Sheets-Sheet 8

Inventor
George Crompton Jr.

Aug. 22, 1944.   G. CROMPTON, JR   2,356,223
HONING MACHINE
Filed June 12, 1942   10 Sheets-Sheet 9
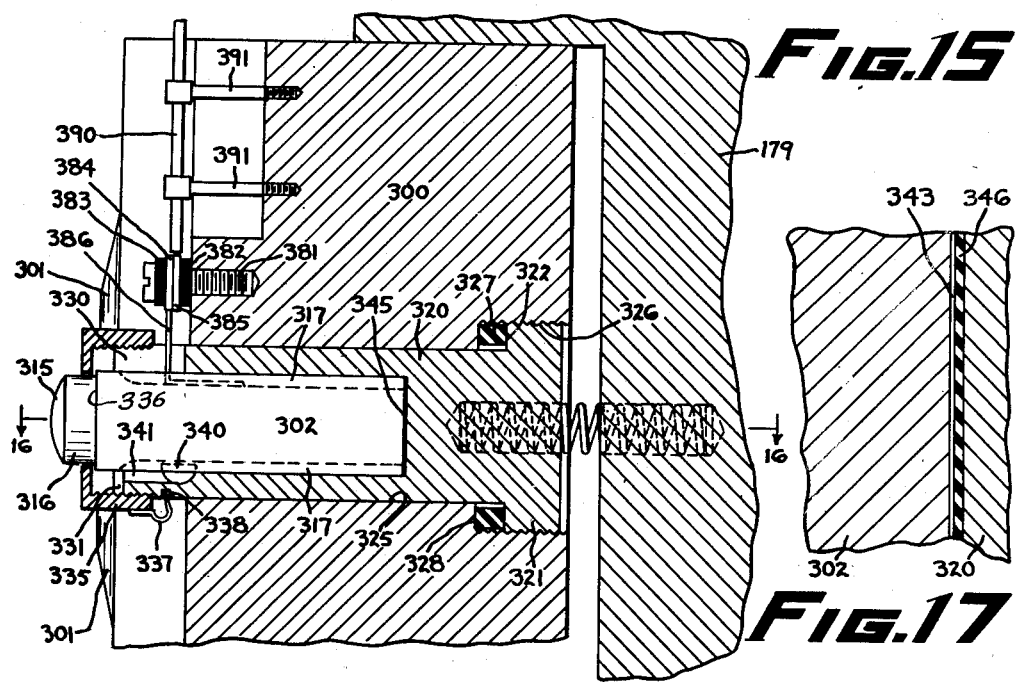
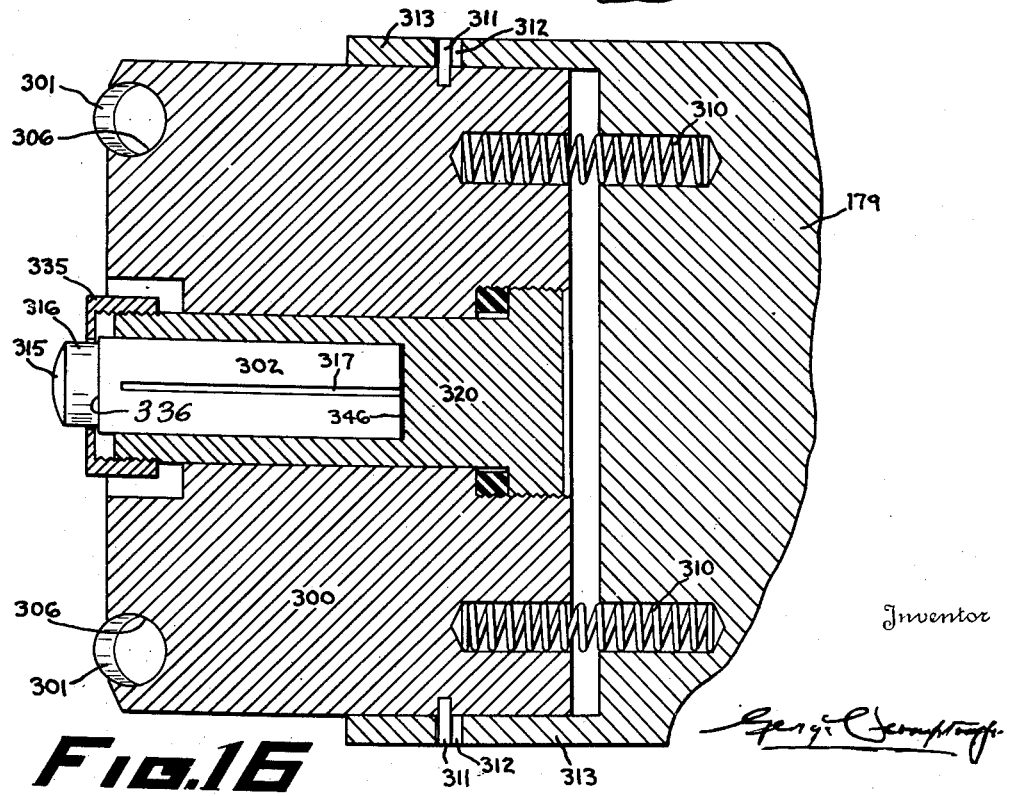
Inventor
George Crompton Jr.

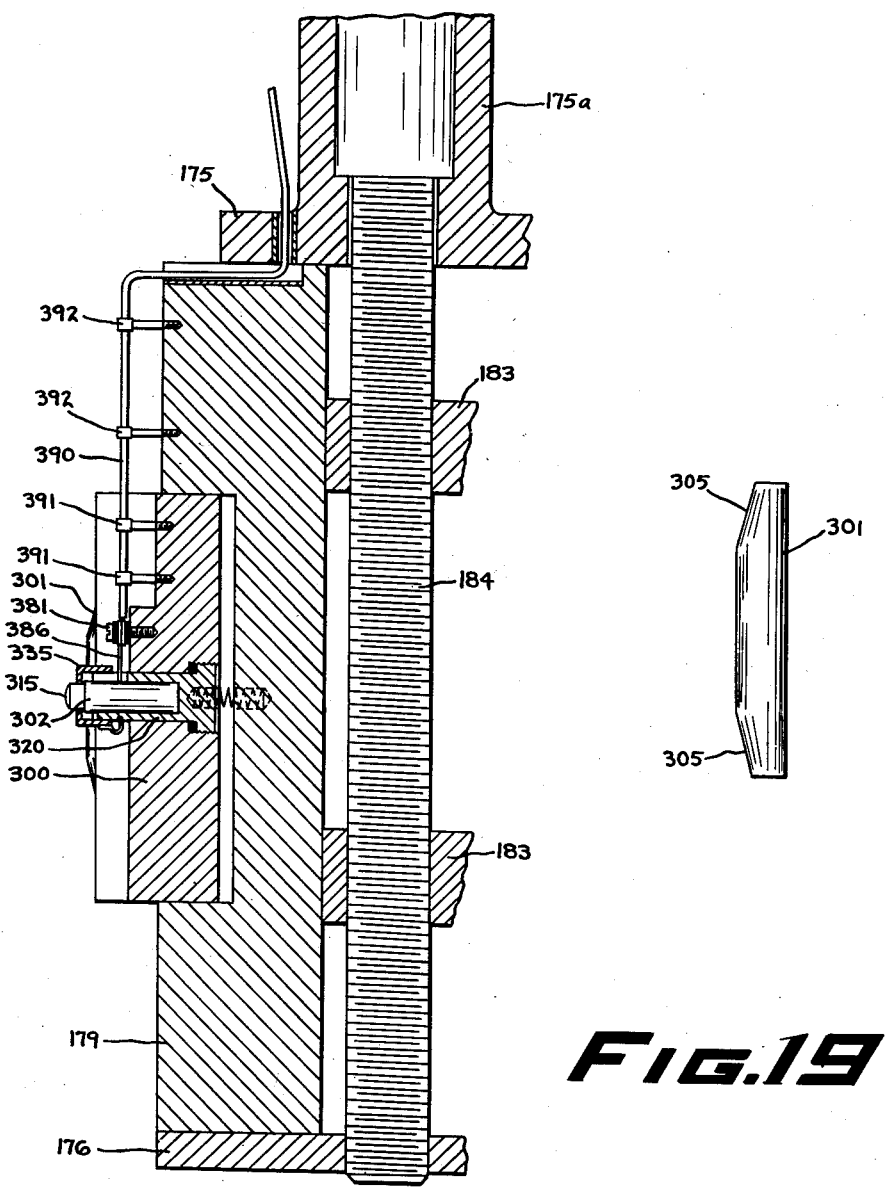

Patented Aug. 22, 1944

2,356,223

UNITED STATES PATENT OFFICE 2,356,223

HONING MACHINE

George Crompton, Jr., Worcester, Mass., assignor to Norton Company, Worcester, Mass., a corporation of Massachusetts Application June 12, 1942, Serial No. 446,743

17 Claims. (Cl. 51—34)

The invention relates to honing machines.

One object of the invention is to provide a honing machine for accurately bringing the several bores of a casting to the same size with a smooth finish. Another object of the invention is to accomplish the preceding object within commercial limits so that but a single size of piston need be provided. Another object of the invention is to accelerate the production of honed multiple cylinder bore castings. Another object of the invention is to increase the efficiency of multiple internal honing.

Another object of the invention is to give the operator controls whereby he can equalize various specific honing operations in a multiple honing job from time to time and be accurately informed of the progress of the honing operations. Another object of the invention is to provide a honing machine utilizing the maximum skill of an operator; giving him instrumentalities to aid him in making the best possible use of his machine and his tools.

Another object of the invention is to provide a control whereby the operator can instantly stop the expansion of a given honing tool of a plurality of honing tools in a multiple honing machine and expand it again as desired. Another object of the invention is to provide a honing machine with a gauge which will give the size of particular bores being honed continuously during the honing operation.

Another object of the invention is to provide a compact honing tool which is expanded by screw wedge means powered by the main driving motor and controlled by an air brake, the whole being so organized as to permit of remote control. Another object of the invention is to provide a honing machine and apparatus permitting the honing tools to be collapsed by reversing the main driving motor which rotates the tools. Another object of the invention is to provide multiple gauging apparatus which at all times gives the size of the several bores being honed together with remote controls for controlling the honing operation in each bore and for collapsing all of the tools and running up the honing head whenever desired.

Another object of the invention is to provide instrumentalities which can be incorporated in automatic machines to advantage. Another object of the invention is to provide an electrical gauge carried by the honing tool itself. Other objects will be in part obvious or in part pointed out hereinafter.

The invention accordingly consists in the features of construction, combinations of elements, arrangements of parts, and in the several steps and relation and order of each of said steps to one or more of the others thereof, all as will be illustratively described herein, and the scope of the application of which will be indicated in the following claims.

In the accompanying drawings illustrating one of many possible embodiments of the mechanical features of this invention, Figure 1 is a front elevation of a honing machine constructed in accordance with my invention;

Figure 4 is an axial sectional view of the work piece and support and a side elevation of a honing tool, the parts being shown on a larger scale than in any of the preceding views;

Figure 5 is an axial sectional view, on a still larger scale, of a honing tool;

Figure 2:
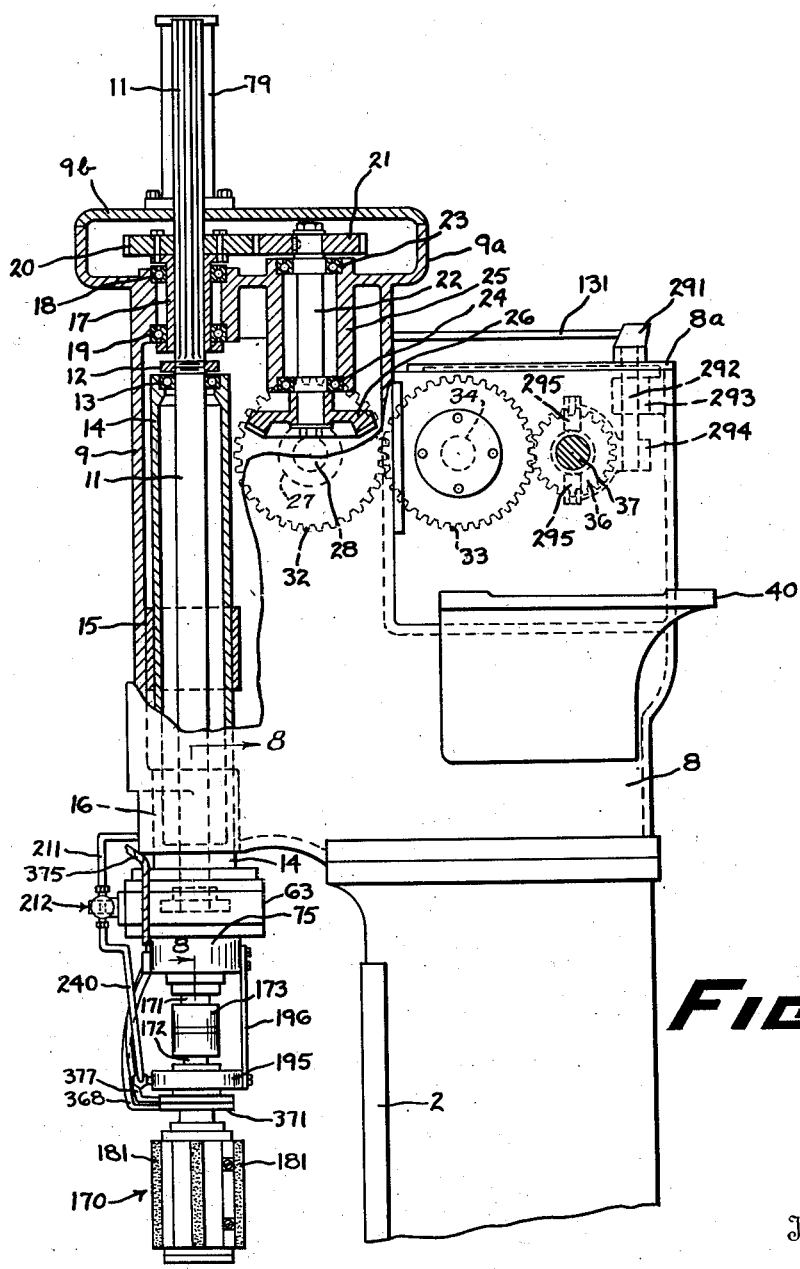
Figure 2 is a view, partly in side elevation and partly in vertical section, of the upper part of the machine, on a somewhat larger scale than Figure 1.
Figures 8, 9, 10:
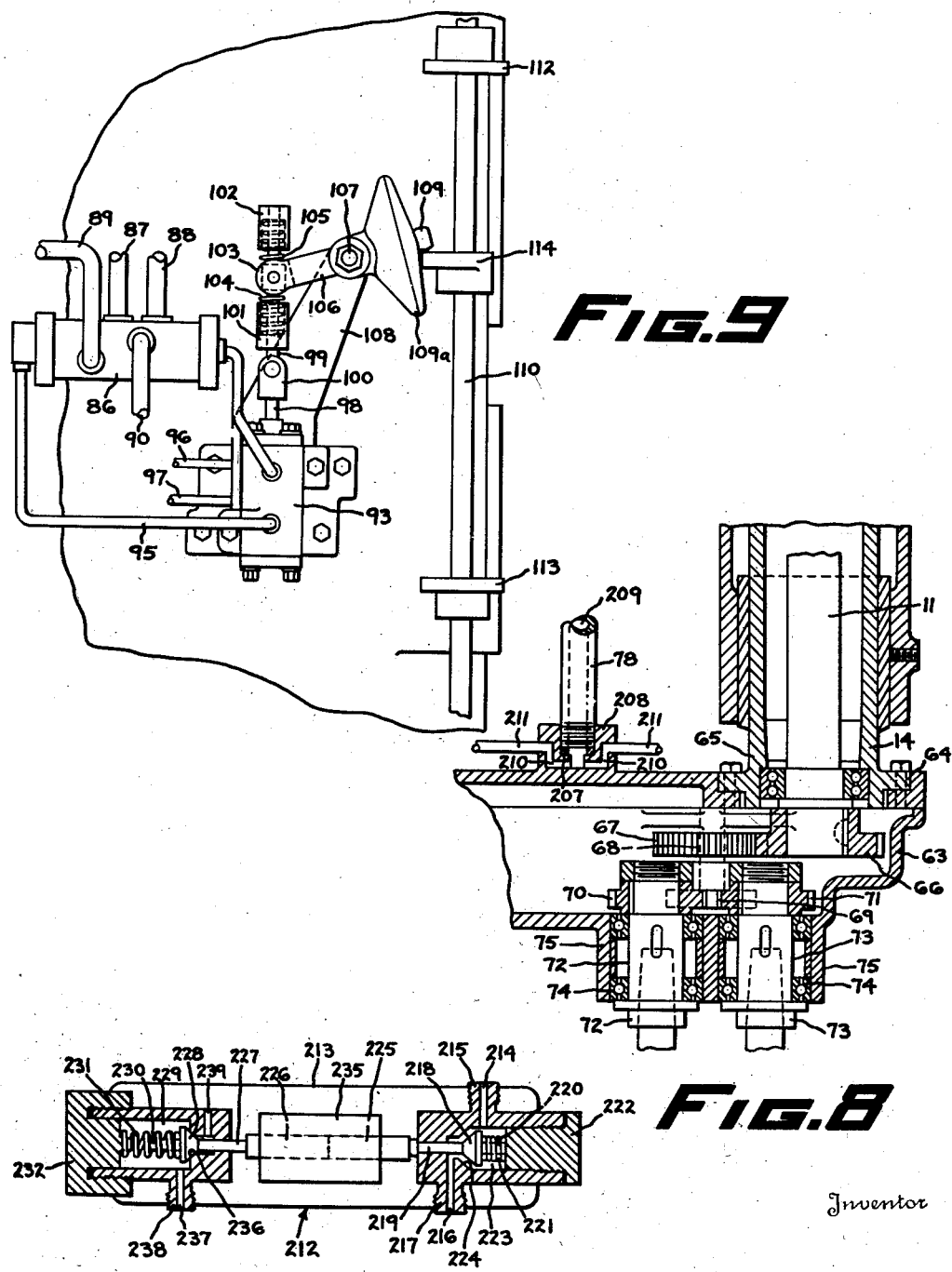

Figures 6 and 7 are cross sectional views taken, respectively, on the lines 6—6 and 7—7 of Figure 5;

Figure 8 is an axial sectional view, taken along the line 8—8 of Figure 2;

Figure 9 is a fragmentary side elevation illustrating certain of the controlling devices for the hydraulic reciprocating mechanism;

Figure 10 is an axial sectional view, on an enlarged scale, of a certain solenoid operated valve;

Figure 11 is an enlarged view, partly in side elevation and partly in vertical section, illustrating the control for stopping the head in its upper position;

Figure 12 is a wiring diagram of the main driving motor and reversing switch;

Figure 13 is an elevation of the control panel and ammeters;

Figure 14 is a schematic view containing an electrical diagram for the variable condenser gauges, an electrical diagram for the solenoid control valves, and an air pressure diagram for the several air brakes for the individual honing tools;

Figure 15 is a greatly enlarged vertical sectional view of the gauging apparatus, taken on the line 15—15 of Figure 6;

Figure 16 is a sectional view on the same scale as Figure 15, taken on the line 16—16 of Figure 15;

Figure 17 is a greatly magnified fragmentary sectional view showing the elements of the condenser;

Figure 18 is a view on the same section as Figure 15 but on a different scale and showing the upper parts of the honing tool, and especially the wiring connections;

Figure 19 is a perspective view of a fixed contact member.

The invention is illustrated applied to a honing machine of the general type disclosed in U. S. Letters Patent No. 1,783,019 of Albert M. Johnson. The invention, so far as it resides in the honing tool itself, is shown embodied in a modification of the honing tool illustrated by U. S. Letters Patent No. 1,912,025 to Frederick G. Wacker and Herman W. Zimmerman. I shall hereinafter refer to these patents, respectively, as the Johnson patent and the Wacker patent.

Figure 1:
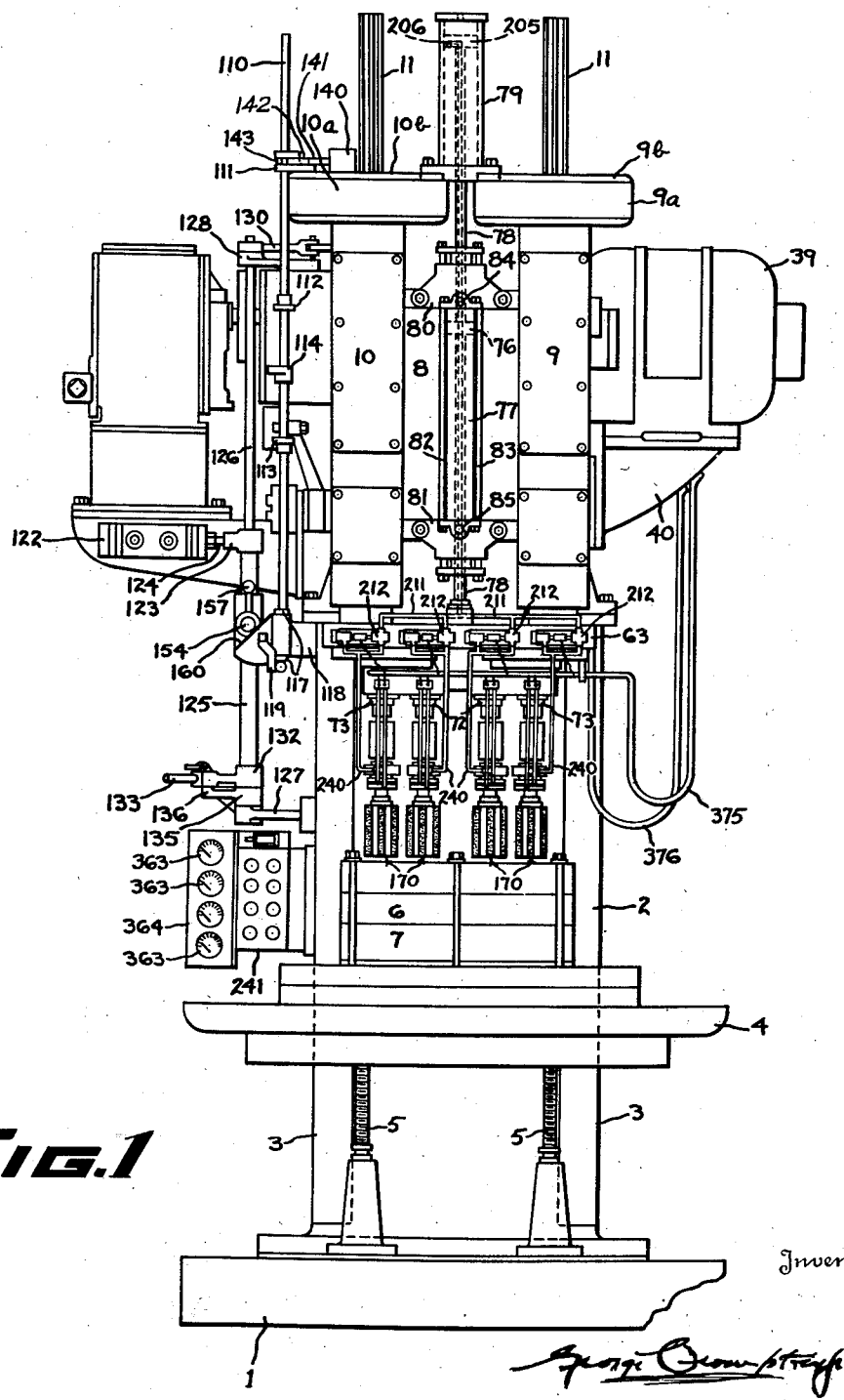

As in the case of the Johnson patent, and referring now to Figure 1, the machine comprises a base 1 upon which is fixed an upright column 2 forwardly provided with a pair of vertical slideways 3. A work supporting table 4 having slidably adjustable guiding supports on the ways 3 is further supported from the base 1 by means of adjustable elevating screw standards 5. A piece of work is shown supported on the table comprising in the present instance a four-cylinder internal combustion motor block 6 suitably clamped upon an adapter block 7 which rests upon the table 4.

Figure 3:
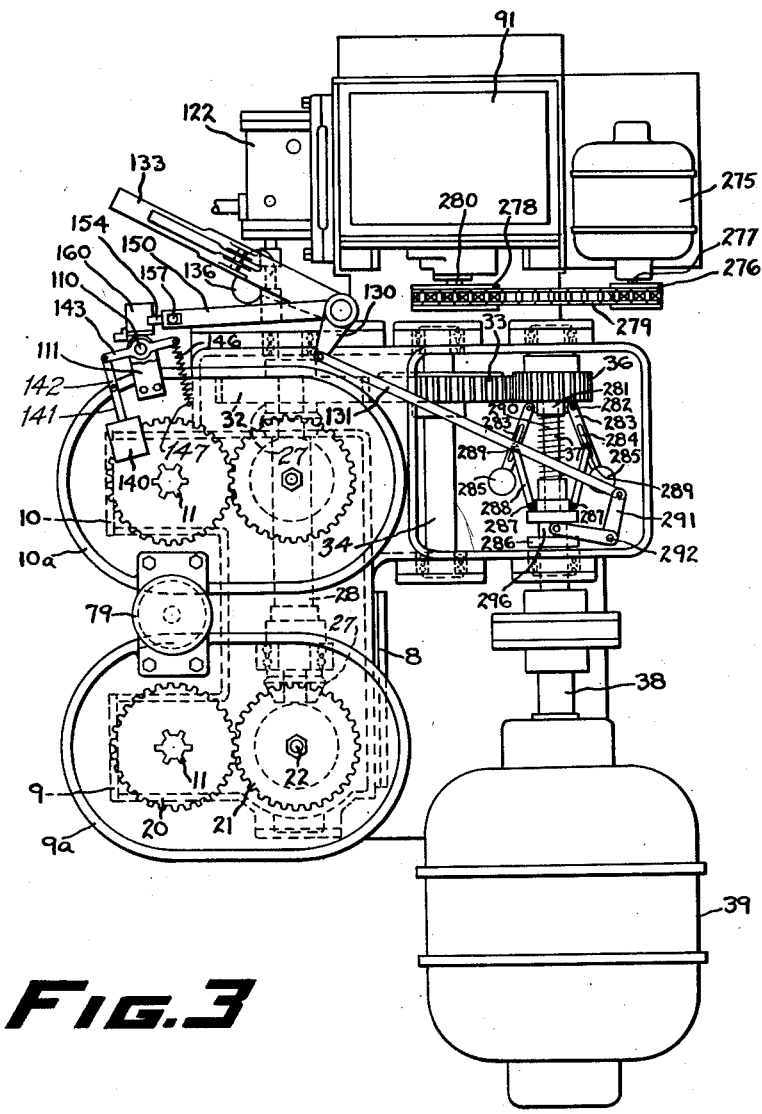
Figure 3 is a plan view of the top of the machine, on the same scale as Figure 2, certain casing covers being removed better to show the parts.

Referring to Figure 2, mounted upon the upper end of the column 2 is a main housing 8 having, as also shown in Figures 1 and 3, a pair of upright auxiliary housings 9 and 10 extending forwardly therefrom in spaced relation, the lower ends of which are positioned above the work supported on the table 4. The auxiliary housings 9 and 10 each support a vertically positioned spindle driving shaft 11. The spindle shafts and their associated parts being similarly constructed, will be described as to one only and similar reference numerals applied to both. The shaft 11 is preferably provided with a thrust collar 12 which engages an anti-friction bearing 13 secured to the upper end of a guide sleeve 14. The sleeve 14 extends through the lower end of the auxiliary housing 9 and is provided with spaced bearings 15 and 16 therein.

Referring to the upper part of Figure 2, the upper end of the spindle driving shaft 11 is splined and extends through the upper wall of the auxiliary housing 9. Within the housing 9 and in longitudinally slidable relation to the splined portion of the shaft 11 there is mounted on the shaft a sleeve 17 which is keyed to the shaft. The sleeve 17 is supported in ball bearings 18 and 19 which are supported in a portion of the housing 9, as clearly shown in Figure 2.

Secured to the upper end of the sleeve 17 and located in a casing 9a carried on top of and integral with the auxiliary housing 9, is a spur gear 20 which meshes with a spur gear 21 mounted on a stub shaft 22 which is journalled in ball bearings 23 and 24 mounted in a bearing hub 25 extending between the auxiliary housing 9 and its connected casing 9a. As shown in Figure 3, there is a corresponding casing 10a on top of the auxiliary housing 10. Continuing now with Figure 2, fastened to the lower end of the stub shaft 22, is a bevel gear 26. Comparing now Figures 2 and 3, and remembering that there are two bevel gears 26, they mesh with bevel gears 27 fastened to a cross shaft 28 in the housing 8. As indicated in Figures 2 and 3, fastened to one end of the cross shaft 28 is a gear 32 which meshes with a gear 33 mounted on a shaft 34 which is journalled in part of the housing 8. The gear 33 is driven by a pinion gear 36 secured to a shaft 37 coupled to an armature shaft 38 of a direct current reversible motor 39 mounted on a suitable bracket 40 supported by a wall of the housing 8. By means of the foregoing mechanism, the motor 39 drives both of the spindle shafts 11 and can drive them in either direction of rotation. The shafts 11 may move up and down without in any way interfering with the rotative driving mechanism on account of the provision of the splined connections between shafts 11 and sleeves 17.

Referring now to Figures 1 and 2, positioned below the lower ends of the auxiliary housings 9 and 10 and fastened to the sleeves 14, is a reciprocatory head 63. Referring now to Figure 8, the head 63 is hollow and the sleeves 14 which constitute reciprocatory guideways are secured to the upper wall of the head 63, each of the sleeves having an annular flange 64 positioned in an annular pocket provided in the upper wall of the head and secured thereto as by bolts. The spindle driving shafts 11 extend into the ends of the head 63, being supported at their lower ends in ball bearings 65 secured in the lower ends of the sleeves 14.

Still referring to Figure 8, fastened to the lower ends of the driving shafts 11 are driving gears 66. These gears 66 mesh with gears 67 fastened to short shafts 68 journalled in the head 63. Each shaft 68 has likewise fastened to it a gear 69, which meshes with gears 70 and 71, respectively secured to spindle supporting socket members 72 and 73, the latter being carried in spaced ball bearings 74 mounted in bearing bosses 75 formed in the lower wall of the head 63. Thus each shaft 11 drives a pair of spindle supporting socket members 72, 73 which are journalled in the head 63, and the sockets 72 and 73 are rotated in the same angular direction and at the same velocity as the gears 70 and 71 do not mesh with each other but mesh with the driving pinion 69.

As shown in Figure 1, there are four socket members 72, 73 and they are located in pairs, each of the sockets 72 being located the same distance from adjacent sockets 73, although the space between sockets 72 is not always the same as the space between sockets 72 and 73. The spacing shown is the same as that of the cylinder bores in a typical internal combustion engine cylinder block 6, but other heads with different spacing of the gears and sockets may be substituted. Furthermore, the machine tool may be widened by adding additional auxiliary housings like the housings 9 and 10 and repeating the mechanism therein contained to drive any number of spindle sockets 72, 73 desired, thus if desired providing a machine of this type for the honing of six cylinder blocks, or eight straight-in-line cylinder blocks.

Referring now to Figures 1 and 8, reciprocatory movement of the head 63 is accomplished by means of a hydraulically actuated piston 76 located in a cylinder 77 which, as shown in Figure 1, is fastened to the housing 8 and located between the auxiliary housings 9 and 10. A piston rod 78 of the piston 76 extends from the lower end of the cylinder 77 and is attached to the head 63. This piston rod 78 further extends upwardly through the upper cylinder head of the cylinder 77 and into a balancing air cylinder 79 which, as shown in Figures 1 and 3, is bolted to the tops of the casings 9a and 10a (not to the cover plates 9b and 10b).

The cylinder 77 is supported on the housing 8 by brackets 80 and 81 which are braced by means of tension rods 82 and 83. The upper and lower ends of the cylinder 77 are provided with ports 84 and 85 opening through the brackets 80 and 81 into communication with the interior of the cylinder. Referring now to Figure 9, there is provided a four-way controlling or reversing valve 86 having ports connected to pipes 87 and 88 which are connected to the ports 84 and 85. Pipe connections 89 and 90 to the valve 86 are respectively connected with the pressure side and the suction side (or the sump) of an oil pump indicated in Figure 3 by the numeral 91.

Referring again to Figure 9, the control valve 86 operates to direct fluid alternately into the pipes 87 and 88 to send pressure fluid to the opposite ends of the cylinder 77 to reciprocate the head 63. At any given time one of pipes 87 or 88 contains fluid under pressure while the other one is the return pipe for the return of the fluid from the no-pressure end of the cylinder. The valve 86 contains a piston, not shown, the position of which is determined by a pilot valve 93 having pipe connections 94 and 95 with opposite ends of the four-way controlling and reversing valve 86. The pilot valve 93 likewise has pressure and exhaust pipe connections 96 and 97 with the pump 91. The pilot valve 93 includes a longitudinally moving piston controlling the ports through the pipe connections with the ends of the reversing valve 86, and this piston is controlled by a piston rod 98. I do not herein illustrate or describe the details of the pistons and ports in valves 86 and 93, the same having not been described in the Johnson patent either, since pilot and reversing valve constructions are now well known to those skilled in this art and any suitable pilot and reversing valves may be utilized, and so far as many features of my invention are concerned any other type of actuating, controlling and reversing mechanism might be substituted for that herein described, for example, a mechanically operated and controlled mechanism of which there are many types.

Resuming the description of this particular controlling and reversing mechanism, and referring again to Figure 9, the piston rod 98 carries a spring stop device comprising a rod 99 pivotally mounted at one end in a block 100 secured to the piston rod 98. The rod 99 has fastened thereto in spaced relation a pair of blocks 101 and 102 which have spring receiving recesses facing each other and holding springs 104 and 105. Between the blocks 101 and 102 is a block 103 which is engaged by the springs 104 and 105, thus offering resilient resistance to the movement of the block 103 along the rod 99. The block 103 is pivotally secured to a reversing lever 106 which is pivotally mounted on a stud 107 projecting from a bracket 108 secured to the side wall of the housing 10. The lever 106 extends to the other side of the stud 107 and terminates in a reversing lug 109 protruding from a counterweighted portion 109a of the lever 106. The pilot valve controlling mechanism is constructed to permit the movement of the pilot valve with a slight overrun in the valve operating lever 106 against spring tension, to assure the complete movement of the valve and protect it against possible damage by jamming. In some respects the pilot valve is a substitute for the load and fire mechanism, arrow point and cam device, or the snapover detent, well known in machine tools for controlling a mechanical reversing mechanism and also used to some extent to control a main valve. Any one of such devices may be utilized to achieve a reversal of the rectilinear travel of the tools as distinguished from a mere stopping thereof.

The machine so far described is the machine of the Johnson patent and, except in combination with the other features hereinafter explained, is not my invention. In fact, any other suitable honing machine tool may be substituted for the machine of the Johnson patent although my invention readily lends itself to incorporation in this machine. Although in the description which is to follow, some parts may be identified as parts of the Johnson machine, the operation and control as well as the several features of the machine are part of my invention, as will hereinafter appear.

Referring now to Figures 1 and 9, I provide a reciprocating control rod 110 which at the upper end passes through and is guided by a bracket 111 extending from the cover of the gear casing 10a. Adjustably fastened to this rod 110 are striking dogs 112 and 113, the striking portions of which are disks and arranged in the path of the reversing lug 109. Also adjustably mounted on the rod 110 and intermediate the dogs 112 and 113 is a shaped dog 114. This dog 114, when in the position shown in Figure 9, moves in the path of the lug 109 and will strike the lug 109 (as shown in Figure 9) to reverse the travel of the head 63. However, when the rod 110 is given a slight turn either manually or by an automatic mechanism hereinafter described, the striking portion of the dog 114 is moved out of the path of the lug 109.

Referring now to Figure 11, there is provided a hand lever 116 fastened to the lower end of the rod 110 by means of which the rod 110 may be manually turned to swing the striking portion of the dog 114 out of the path of the lug 109. Referring now to Figures 1 and 11, fastened to the rod 110 are thrust collars 117 which secure it so far as vertical movement is concerned to a bracket 118 which is fastened to the side of the head 63. Therefore, the rod 110 moves upwardly and downwardly with the head 63. I provide a stop arm 119 fastened to and extending downwardly from the bracket 118 and extending into the path of movement of the hand lever 116 to prevent movement to the left (Fig. 1) of the hand lever 116 beyond the position shown in Figure 1. In the position of Figure 1, the operating portion of the intermediate dog 114 is in the path of the lug 109.

The reciprocating movement of the head 63 is further controlled by a stop valve 122 (Figures 1 and 3) interposed in the main pressure line from the pressure pump 91 which normally allows oil to be directed under pressure to the four-way valve 86 but which may be moved to by-pass the oil back to the suction side of the pump. When the valve 122 is so moved, the head 63 will come to a stop. This stop valve 122 is operated by an arm 123 connected to the valve stem 124 of the valve member of the stop valve 122. The arm 123 is mounted on a sleeve 125 which is journalled on a rod 126 extending between and journalled in brackets 127 and 128, the former fastened to the column 2 and the latter fastened to an upper part of the housing 8, as shown in Figure 1. Fastened to the inside rod 126 is an arm 130 which, as shown in Figure 3, is connected by a link 131 with a governor mechanism to be later described. The sleeve 125 extends downwardly as far as and is secured to the hub of an operating lever 133 while the rod 126 extends below the hub 132 and is fastened to the hub 135 of an operating lever 136. By a latch mechanism fully described in the Johnson patent, the operating lever 133 may be connected to actuate the lever 136 or it may be disconnected therefrom for independent control of the sleeve 125 and thereby the stop valve 122. Usually the two levers 133 and 136 are connected together and operate as a unit and thereby the controls more fully described hereinafter serve automatically to stop rotation of the spindle sockets 72 and 73 whenever the traverse of the head is automatically stopped in its upper position and, furthermore, the controls serve to stop the traverse of the head in any position when the spindle sockets 72 and 73 stop rotating.

Referring now to Figures 1, 3 and 12, I provide an electric control to cause the honing tools hereinafter described to be raised out of the work piece by upward movement of the head 63 when desired by the operator. To the top of the cover of the gear casing 10a is fastened a solenoid 140 which has a core 141 connected by a link 142 with a lever 143 keyed to the rod 110. The rod 110 is splined at the top portion thereof to permit it to move through the lever 143, and the bracket 111 provides a bottom and top thrust bearing for the lever 143, the bracket 111 being forked, as shown in Figure 1. The other end of the lever 143 is connected by means of a spring 146 to a spring anchor 147 secured to the cover 10b of the gear casing 10a. In Figure 3 all the covers have been removed more clearly to show the gearing and other mechanisms. But the various parts including the bracket 111, the spring 146, a solenoid 140 etc. are shown in the position which they would occupy were the cover 10b in place. By reason of the fact that the bracket 111 is attached to the cover and forms the thrust bearing for the lever 143, the entire unit including the cover can be lifted vertically upward off the shaft 110 whenever it is desired to remove the cover of the gear casing 10a and the cover can, of course, be replaced by fitting the parts upon the shaft 110 and then moving everything downwardly.

The spring 146 endeavors at all times to turn the rod 110 in a clockwise direction in plan view. The force of this spring 146, therefore, keeps the handle 116 against the stop 119 and maintains the dog 114 in the path of the lug 109. Energization of the solenoid 140 will turn the rod 110 in a counterclockwise direction, thus removing the dog 114 from the path of the lug 109 and permitting the head 63 to continue its upward movement away from the normal reciprocatory traverse range.

The dog 112 operates on the lug 109 as a reversing dog to reverse the direction of travel of the head 63. The dog 114 likewise operates on the lug 109 to reverse the direction of travel but, as explained, it can be moved out of the path of the lug 109 either manually by operation of the hand lever 116 or by energization of the solenoid 140. The dog 113 will also reverse the travel of the head 63, but I desire to stop the head 63 in its withdrawn position at the finish of a honing operation and, therefore, I provide an additional mechanism automatically to operate the stop valve 122 just before the dog 113 would engage the lug 109. Therefore, when the machine is started up again, the dog 113 first shifts the lug 109 to reverse the reciprocating mechanism. That is to say, the head 63 may first rise by a slight distance, for example, a fraction of an inch before it descends to commence a honing operation.

Referring now to Figures 1, 3 and 11, I provide an arm 150 having a hub 151 fastened to the sleeve 125. The outer end of the arm 150 has a bore 152 receiving a spring 153 bearing against a movable pin 154 in the bore 152. There is a slot 155 in the top of the arm 150 through which projects an operating rod 156 secured to the pin 154. The operating rod 156 is provided with a knob 157 for convenient operation.

The bracket 118 has an inclined cam surface 160 which is in position to engage the pin 154, and when it does so it will swing the arm 150 to the left, Figure 1, operating the valve 122 and stopping the head 63 by by-passing the pressure fluid. Figure 1 shows the cam surface 160 engaging the pin 154 and the head 63 is about to stop, the arm 150 having been moved partially but not through the entire distance. This action preferably takes place in advance of the dog 113 striking the lug 109 so that the head is brought to a stop without reversing the pilot valve 93 and thereby the reverse valve 86. This precaution eliminates the possibility of the head being reversed and traveling downward to cause the hones to reenter the finished work piece. When the operator is ready to hone a new work piece, however, he may push the knob 157 rearwardly which will place the pin 154 behind the bracket 118, allowing the rod 126 to be partially rotated to reestablish the fluid pressure connections which will cause the head 63 to descend after a slight rise to cause the reversing action by pushing the lug 109 past the center point.

Referring now to Figure 2, the hones are units and are designated generally by the reference character 170. That is to say, the honing tools are completely removable from the machine and are self-contained tools. Each hone 170 has a spindle 171 having a tapered end portion fitting in a socket 72 or 73. The spindles or shanks 171 are connected to lower spindles 172 by means of flexible couplings 173 the construction of which may be as described in the Johnson patent, or universal joints may be substituted, if desired. The provision of either one allows the honing tool 170 to adjust itself in the bore of the cylinder block work piece 6, for it must be understood that previous operations on a cylinder block do not bring the axes of the several bores into the same plane all exactly a given distance apart within the matter of a thousandth of an inch or fractions thereof which are significant dimensions in a finishing operation of the nature performed by a machine of the invention.

Referring now to Figures 5 and 6, I have therein illustrated a honing tool which may be and preferably is constructed substantially in accordance with the Wacker patent aforesaid. The operation thereof including the pneumatic brake to be described, however, is my own invention. I do not deem it necessary to describe the honing tool in detail (apart from the new features) since reference may readily be had to the Wacker patent and, furthermore, many and various types of honing tool instrumentalities may be substituted so far as my invention is concerned. Briefly, the Wacker patented hone includes an upper plate 175 which, however, I have formed as the lower part of a hollow spindle 175a, and the Wacker patented hone includes a lower plate 176, and the plates 175 and 176 are connected by tie bars 177, as described in the Wacker patent. Whereas for a four-stick hone there are four tie bars 177 in the Wacker patented construction, I have replaced one of these with a somewhat thicker and heavier member 178 on one side and a similar member 179 on the other side in which I incorporate the bore diameter measuring apparatus to be presently described. The plates 175 and 176 together with the tie bars 177 and the members 178 and 179 form a cage construction guiding carriers 180 upon which are detachably mounted honing sticks 181. Each carrier 180 has inclined surfaces 182 which are engaged by cones 183 mounted on a screw shaft 184 which extends through the upper plate 175 and is journalled in the hollow spindle 175a and is integral with the lower part of the flexible coupling 173. Thus according to my invention, and in this respect the construction and operation differ from that of the Wacker patent, the screw shaft 184 is the driving member so far as the honing tools 170 are concerned. Garter springs 185 engage portions of the carriers 180 and removably hold the structure in assembled relation. The cones 183 are prevented from rotating with respect to the inclined surfaces 182 of the carriers 180 by means of splines 186 in the cones and projections 187 on the members 178 and 179 projecting into the splines. The bottoms of the splines are parallel to the axis of the honing tool so that the cones 183 are free to move vertically relative to the honing tools 170 and yet are non-rotatable with respect to the honing tool as a whole which means that they always rotate with it. It will now be seen that rotation of the screw shafts 184 causes rotation of the honing tools as a whole because the screw shafts 184 tend to rotate the cones 183 and these cannot rotate without rotating the cages and the entire honing tools 170. This principle does not hold when the cones 183 are free to move downwardly. But the cones 183 are not free to move downwardly unless the carriers 180 can move outwardly, and during the honing operation the carriers are limited in their outward movement due to contact of the sticks 181 with the bores of the work pieces. But the very fact of contact of the sticks 181 with the bores of the work pieces causes resistance to turning of the honing tools and this in turn sets up a force derived from the screw shafts 184 tending to move the cones 183 in a vertical direction. Of course, the direction of rotation of the honing tools and the pitch of the screws 184 is such that the normal honing rotative drive tends to expand the honing tools.

The net result of these forces is that the honing tools must rotate and at the same time they are and must be urged to expand which creates a honing pressure in each work piece cylinder. As will hereinafter be described, I provide brakes for the hollow spindles 175a which will increase this honing pressure and I provide further means in the form of a reversing switch for reversing the direction of rotation of the armature of the motor 39, thus reversing the direction of rotation of all of the screw shafts 184 simultaneously, and when this is done and the brakes are applied the cones 183 are moved upwardly by the screw shafts 184 and all of the honing tools contract.

The cones 183 are, of course, threaded internally, and constitute nuts on the screw shaft 184.

The honing sticks 181 may be of any suitable type, for example, bonded abrasive consisting of any of the usual abrasives such as silicon carbide or alumina in its various forms, also diamonds, and the bond may be of any desired type, for example, vitrified ceramic bond, resinoid bond including natural and synthetic resins, rubber, or metal bond, for example, as descirbed in Van der Pyl Patent No. 2,072,051.

Referring now to Figures 4, 5 and 6, the upper part of the hollow spindle 175a has a reduced diameter portion 190 which may be cylindrical and which is one element of the brake referred to. The hollow spindle 175a further has a flange 191. On top of the hollow spindle 175a is a washer 192 maintained in position by bolts 193. The brake surface of the portion 190, the flange 191, and the washer 192 position an annular casing 195 which may be made out of sheet metal or the like and which is loosely fitted in the position shown so that it may be held stationary while the hollow spindle 175a rotates. In Figure 2 is shown a metal bar 196 which is fastened to one of the bosses 75 and also to a casing 195, thus preventing the casing from rotating. The bar 196 is not so rigid but that slight eccentric motion of the casing 195 due to misalignment of the bores in the work piece is permitted. It will be understood that just as there is a brake mechanism for every honing tool, so also there is a holding bar 196 for every casing member 195.

Figure 7 shows a cross section of the casing 195. As therein shown, the casing 195 contains a rubber ring 200 surrounding a plurality of brake sectors 201 made of metal or any suitable material desirably having friction shoes 202 cemented thereto. These friction shoes 202 may be made of leather, if desired. When air under pressure is introduced into the chamber 203 formed by the casing 195 and the rubber ring 200, the rubber ring contracts, forcing the brake sectors 201 inwardly in radial directions, pressing the friction shoes 202 against the cylindrical surface of the reduced diameter portion 190. Thus, by the expedient of introducing compressed air into the stationary chamber 202, a braking force is exerted against the hollow spindle 175a and the entire cage construction of the honing tool 170 which is connected to said hollow spindle 175a. The invention provides means at the will of the operator for introducing air into any one or more of the chambers 203 or all of them together and for exhausting it from any one or more of the chambers 203 or all of them together.

Referring now to Figures 1, 8, 10 and 14, and first to Figure 1, the cylinder 79 contains air under pressure. This causes a constant force to be exerted against a piston 205 in the cylinder 79, thus exerting a constant upward force on the long vertical piston rod 78. This force is calculated to be approximately equal to the weight of the head 63 and all the vertically movable parts connected therewith, such as all of the honing tools 170 and the spindle driving shafts 11 and the sleeves 14 etc. According to the present invention I make use of the air pressure in the cylinder 79 to actuate the brakes just described. As shown in Figure 1, the piston 205 has a U shaped passage 206, one end opening at the under side of the piston 205 into the cylinder 79 and the other end connecting to the inside of the piston rod 78 which is hollow. Referring now to Figure 8, the piston rod 78 is attached to the head 63 by virtue of being screwed into a boss 208 formed on the upper part of the casing of the head 63. A passage 209 in the hollow piston rod 78 is connected with passages 210 formed in the boss 208 leading to pipes 211. A rubber washer 207 may be provided between the bottom of the screw threaded bore in the boss 208 and the bottom of the piston rod 78 which is externally screw threaded. Thus air under pressure is at all times in the pipes 211 which are carried by the reciprocating head 63.

Referring now to Figure 1, the pipes 211 branch and lead to a plurality of valves 212. There is one valve 212 for each honing tool. Referring now to Figure 10, each valve 212 is part of valve control apparatus constructed on a base 213. The valve 212 includes an air entrance port 214 formed in a screw threaded pipe connection 215 and an air port 216 which is connected to a chamber 203, the port extending through a screw threaded pipe connection 217; a poppet valve 218 having at one end a shank 219 and at the other end a shank 220, a spring 221 surrounding the shank 220, and a closure plug 222. The poppet valve 278 works in a chamber 223 in which is a valve seat 224. The spring 221 urges the poppet valve 218 against the seat 224. However, abutting the shank 219 is a solenoid core 225 made of iron or some other magnetic material and this is connected to a non-magnetic bar 226 which abuts the shank 227 of another poppet valve 228 in a valve chamber 229. The poppet valve 228 has a second shank 230 surrounded by a spring 231 which is backed up by a closure plug 232. The spring 231 is stronger than the spring 221, so when a solenoid 235 surrounding the solenoid core 225 is not energized, the parts will be in the position shown in Figure 10 with the poppet valve 218 open and the poppet valve 228 seated against a seat 236.

The chamber 229 has a port 237 entering it which extends through a threaded piping connection 238 and a port 239 extends from the right-hand side of the poppet valve 228 to the atmosphere. Referring now to Figure 1, pipes 240 extend from the casings 195 upwardly and branch and each pipe 240 is connected to each of the pipe connections 217 and 238 and, therefore, to the ports 216 and 237. With the parts in the position shown in Figure 10, air under pressure from the cylinder 79 at the top of the machine is admitted to the particular chamber 203 in a casing 195 controlled by that particular valve apparatus. However, when that particular solenoid 235 is energized, the iron core 225 is drawn inwardly and this forces open the poppet valve 228 and at the same time allows the poppet valve 218 to be closed by the spring 221 (assisted by the air pressure itself). This cuts off the air pressure from the particular chamber 203 controlled by that particular solenoid 235 and valve apparatus and opens up the chamber 203 to the atmosphere via a pipe 240, a port 237, a chamber 229 and exhaust port 239. So, therefore, to sum up, when a particular solenoid 235 is unenergized, a particular brake mechanism is exerting a braking force against a particular hollow spindle 175a, and when that same solenoid 235 is energized there is no longer any braking action against that same hollow spindle 175a.

Referring now to Figures 1, 13 and 14, fastened to the column 2, preferably on the left-hand side thereof, that is to say, near the levers which control the machine, is a push button panel 241 having, as better shown in Figure 13, push buttons 242 and 243. Each pair of push buttons 242, 243 controls a solenoid 235. When the buttons 242 are pushed in, the circuits are open but when the buttons 243 are pushed in, the circuits are closed to energize the solenoids 235. As shown in Figure 14, the wiring is very simple and may consist of a positive line 244 and a negative line 245. The positive line 244 is connected by conductors 246 to one terminal of each solenoid 235. The negative line 245 is connected to terminals 247 of the push button switches under the buttons 242. The other terminals of the solenoids 235 are connected by conductors 249 to terminals 250 of the push button switches under the buttons 242. Without further description, it will be evident that the operator has individual control over each of the solenoids 235 and, therefore, over the brake mechanisms described. Figure 14 also illustrates diagrammatically the pipe connections and valves which have already been described.

I also provide a control for the driving motor 39 which rotates the honing tools, interlocked with a control for the solenoid 149 which controls the movable dog 114. These controls are diagrammed in Figure 12. A positive line 251 leads to one center terminal 252 of a reversing switch and also by a connected line 253 to the field coils 254 of the motor 39. The negative line 255 is connected to the other center terminal 256 of the reversing switch and by a connected line 257 to the other end of the field coil of the motor 39. One brush 258 of the motor 39 is connected by a conductor 259 to a pole 260 of the reversing switch. The other brush 261 of the motor 39 is connected by a conductor 262 to an adjacent pole 263 of the reversing switch. The usual cross wires 264 and 265 connect the poles 260 and 263, respectively, to opposite poles 266 and 267. The knives 268 of the reversing switch will also engage poles 269 and 270 connected by conductors 271 and 272 to the solenoid 240. The reversing switch parts are located on the panel 241 just above the push buttons 242, 243, as shown in Figure 13.

In this embodiment of this invention, as shown in Figure 3, the pump 91 is independent of the motor 39 and may be driven by a motor 275 having a sprocket 276 on its armature shaft 277, the sprocket 276 driving a sprocket 278 by means of a chain 279, and the sprocket 278 being on the pump shaft 280.

According to the present invention, the honing operation is stopped by first stopping the motor 39. Owing to the friction on the stones 181 in the work piece bores, the honing tools will quickly stop rotating. But it is desired that as the rotation dies, the reciprocatory traverse should also cease as otherwise the cylinder bores might be scored by vertically moving but non-rotating sticks 181. So, therefore, I provide the governor shown in Figure 3 connected to the stop valve 122 already described. Referring now to Figure 3, upon the shaft 37 is fastened a collar 281 supporting pins 282 which mount arms 283 having slots 284 and, at the ends remote from the pins 282, centrifugal balls 285. Mounted upon the shaft 37 also is a slidable collar 286 having pins 287 supporting arms 288 having pins 289 extending into the slots 284. These constitute ball governor apparatus so that when the shaft 37 is rotating at high speed, the balls 285 fly outwardly and pull the collar 286 toward the gear 36. When, however, the shaft 37 slows down, a spring 290 pushes the collar 286 away from the gear 36. The link 131 is connected to an arm 291 resting on top of a casing cover 8a for part of the main housing 8. Referring now to Figure 2, the arm 291 is detachably fastened to a vertical shaft 292 mounted in a bearing 293 fastened to the casing 8. The shaft 292 extends downwardly and is fastened to a yoke 294 having rollers 295 extending into a groove 296 (see now Figure 3) in part of the collar 286. The groove 296 is wider than the rollers 295 to provide some lost motion. By reason of this mechanism, when the shaft 37 stops, the valve stem 124 is pushed inwardly which moves the stop valve 122 to traverse stopping position, thus stopping the reciprocation of the hones when their rotation is stopped.

Considering now the apparatus for measuring the size of the bores of the work pieces, reference may first be had to Figure 14 and from that figure, specific reference to Figures 1, 2, 4, 5, 6, 15, 16 and 17 will disclose the detailed construction and arrangement. Each member 179 is cut out to form guideways for a block 300 which has a pair of fixed contact members 301 and a movable contact member 302. The contacting portions of the contact members 301 and 302 should be made of some very hard and wear resistant material. An excellent material for this purpose is boron carbide B₄C in molded form sold by Norton Company under the trade mark "Norbide." This can be molded into simple shapes and more complex shapes can be made by grinding it with a diamond grinding wheel.

The fixed contact members 301 are illustrated in Figure 19. As therein shown, they consist of cylinders of boron carbide rounded at the ends to form frusto-conical entering portions 305. Norbide can readily be molded into cylindrical form and the frusto-conical portions 305 can be formed on it by means of a diamond grinding wheel.

As shown in Figure 16, these fixed contact members 301 fit in partial cylindrical holes 306 in the block 300. The frusto-conical portions 305 contact the mouth of the work piece cylinder bore as the tool enters it and, therefore, push the block 300 inwardly against springs 310 which extend partly into the movable block 300 and partly into the member 179. The block 300 is prevented from flying out altogether as, for example, prior to the time when the tools have entered the work piece bores by means of pins 311 projecting from the block 300 and into slots 312 in a portion 313 of the member 179.

Referring now to Figures 15, 16 and 18, the movable contact member 302 is also a cylinder of Norbide shaped as follows: At the outer end is a spherical zone tip 315 which contacts the work piece bore. Next to that is a reduced diameter portion 316. On opposite sides of the cylinder are splines 317. All of these portions can be made with diamond wheels.

The movable contact member 302 fits with a sliding fit in a cylindrical holder 320. This cylindrical holder 320 has an enlarged diameter externally threaded portion 321 leaving a pronounced shoulder 322 and it in turn has a snug fit in a bore 325 in the block 300. The bore 325 merges into a larger and internally threaded bore 326 into which the portion 321 screws. A large rubber washer 327 fits between the shoulder 322 of the portion 321 and a seat 328 which joins the bores 325 and 326.

The front or left-hand end of the cylinder holder 320 has a long slot 330 and diametrically opposite to it a short slot 331. These slots together will receive a screw driver by means of which the cylindrical holder 320 can be turned. This adjusts the cylindrical holder back and forth in the member 300. Naturally enough, extra washers 327 can be provided for large adjustments, but for small adjustments the washer 327 will be compressed more or less and this also prevents undesired change of the adjustment.

To hold the movable contact member 302 from flying out altogether, a cap 335 is screwed onto the end of the cylindrical holder 320 which is externally threaded at this point and the cap 335 will be contacted by the shoulder 336 which forms the boundary between the reduced diameter portion 316 and the full diameter part of the movable contact member 302. The cap 335 may be prevented from accidental unscrewing by means of a bendable piece of metal 337 which will fit in any one of a number of holes 338 formed in the exterior cylindrical surface of the cylindrical member 320. The cap, of course, can be easily removed simply by bending the metal 337 with a pair of pliers.

The movable contact member 302 is prevented from rotating in the cylindrical holder 320 by means of a Woodruff key 340 which fits in the spline 317 and also a short spline 341 in the bore of the cylindrical holder 320. The bottom of the other spline 317 is silvered and the right-hand base of the movable contact member 302 has a layer of silver 343; see Figure 17. The layer of silver 343 should connect with the silver on the bottom of the spline 317 but should not extend quite to the cylindrical surface of the movable contact member 302. The movable contact member may be silvered as follows: The entire member is inserted in a silver solution, such as a solution used to make mirrors, and a good plate of silver is formed. Then those portions which it is not desired to be silvered have the silver removed therefrom. It would not be necessary to remove the silver from every part of the movable contact member 302 but it would suffice to isolate the portion at the bottom of the spline 317 and the silver layer 343 from everything else but each other.

At the right-hand end of the movable contact member 302 and between it and the plane surface 345 constituting the bottom of the bore in the cylindrical member 320 is a rubber disk 346. The surface 345, the silver 343, and the rubber disk 346 constitute the elements of a condenser. High frequency current is used and it is desired that the capacity of the condenser be relatively large as compared with the capacity of the circuit as a whole; hence the rubber 346 can be very thin, for example, of the order of five to ten thousandths of an inch in thickness. This is possible because the relative motion of the movable contact member 302 between the start of the honing operation and the finish thereof may be a matter of only some ten thousandths of an inch.

Considering now the circuit which includes the condensers 343, 345, 346 which in the diagrammatic views I give the numeral 350 as a whole, and referring now to Figure 14, I provide a suitable source of high frequency electricity 360 which is simply designated by the legend "Electronic tube high frequency generator." This source may have a frequency in megacycles and I do not need to describe such a generator since they are now known in the electronic art. One terminal 361 of the generator 360 is connected by a line 362 and branches 362a to one terminal of a series of ammeters 363 which, as shown in Figure 1, may be located on a panel 364 to the left of the panel 241. The other terminals of the ammeters are grounded into the frame of the machine. The silver 343 is connected to the second terminal 365 of the high frequency source 360 by means of a conductor 366 and branches 367 leading to contact brushes 368 which, as shown in Figure 5, contact a metal ring 370 in insulating rings 371 surrounding and fastened to the hollow spindle 175a.

It is of some importance to point out the action and mechanical details of the electrical connections in this invention. It is desirable to have the capacity of the circuits (apart from the condensers themselves) as low as possible. I, therefore, use ground for one part of the circuit to avoid two insulated wires side by side which would set up capacity. Referring now to Figure 1, a cable 375 can contain the conductor 366, constituting one side of the high frequency circuit. This cable 375 is fastened to the movable head 63 and is also fastened to the bracket 40 and forms a variable loop as the head 63 moves up and down. It can also contain the wires 346 and 349 leading to the solenoids 235 because those are closed circuits not connected with the high frequency circuits. It is also desired to avoid variable resistance represented by the oil films in the journals of the machine and, in fact, these journals themselves have capacity. The ground or base of the machine may, therefore, be connected to the movable head 63 by means of a second hanging conductor 375. The ground side of the circuit is now connected to the movable head 63 and yet, interposed therebetween and the rotating hollow spindle 175a, are the journals in the head which as aforesaid may constitute condensers and have a great deal of capacity. So, therefore, I provide a brush 377 contacting a metal ring 378 in the insulating ring 371 but which is connected to a ground portion 380 to ground the current into the hollow spindle 175a whence by direct bolted connection it reaches the member 179. There is no appreciable amount of capacity in the jumping from the member 179 to the sliding block 300 because the springs 310 make a good electrical connection and the electricity can move into the cylindrical holder 320 which is in direct metallic contact with the block 300 and no oil film needs to be used between these parts.

Referring now to Figures 5, 15 and 18, I provide a terminal screw 381 having insulating rubber washers 382 and 383 between which are a pair of terminal rings 384, 385. The ring 384 has integral therewith a connecting terminal 386 soldered to the silver at the bottom of the spline 317. The ring 385 is the end of an insulated wire 390 which leads directly to the ring 370. This insulated wire 390 is supported by resinoid screw posts 391 and 392 screwed, respectively, into the block 300 and the member 179. The block 300 is cut away, as shown, and the wire 390 is well spaced from the metal except where it goes through the disk 175. In this way capacity in the high frequency circuits is held at a low figure apart from the condensers 350.

The machine is a manually controlled machine but the operator may read the sizes of the bores on the ammeters 363 and bring all the bores to the desired diameter at the same moment and then cause the head 63 to move upwardly carrying all of the honing tools out of the bores.

When starting the machine, the operator first throws the main reversing switch which receives current from the lines 251, 252 to connect the center terminals 252, 256 to the poles 260, 263. This starts up the motor 39 in what may be called the positive direction. As a consequence thereof, the ball governor which includes the balls 285 expands and moves the collar 286 towards the gear 36. This draws the link 131 to the right (Figure 3) and opens the valve 122 provided the operator simultaneously pushes rearwardly the knob 157 to permit the valve to be moved. At this time or previously a switch (not shown) for the motor 275 is closed to actuate the fluid pressure pump 91. The solenoid 140 is unenergized on account of the position of the main reversing switch and, therefore, the spring 146 controls the rod 110. Due to this fact, the head will reciprocate in an idle upper position but at any time the operator can move the hand lever 116 to allow the head 63 to move downwardly and then let it go again to continue the reciprocatory traverse in the lower or working position. All this time the push buttons 243 should be in so that the solenoids 235 are energized and there is no air pressure in the chambers 203. The hones, which had been contracted at the completion of the previous honing operation, will therefore remain contracted. Due to the lost motion connection between the rollers 295 and the groove 296, the traverse is slow but the operator may speed it up by moving the lever 133.

It is now time to check the ammeters 363. The honing may be started first on the smallest bore, it being sufficient to push the appropriate button 242. This admits air to the cylinder 203 because it opens a circuit and deenergizes a solenoid 235 and a particular hone is expanded. When this smallest bore has been expanded to the size of the next smallest bore, as indicated by the ammeters 263, the appropriate button 242 is pushed in and so on until all of the hones are working in the work piece cylinder bores. If, during the course of the honing operation, one bore should become larger than the others, the appropriate button 243 can be pushed in to slow down the honing operation in that particular bore. Or perhaps one bore will be undersized with respect to all of the others, in which case three buttons 243 can be pushed in until the sizes are again equal. Thus the operator controls the honing operation to keep all the bores at the same size during the enlargement thereof to final diameter. The operation is somewhat analogous to the geometrical proposition that when variables approaching their limits are always equal, their limits are equal. Thus when finally all the bores arrive at the desired diameter, the operator will throw the main reversing switch to connect the center terminals 252 and 256 to the poles 266, 267, 269 and 270. The operator should make the change slowly so that the motor 39 will come to a stop before the current flows through the ammeter in the reverse direction. As the motor 39 stops, the vertical traverse is brought to a stop by the automatic closing of the valve 122. Remembering that the air is on in all of the air brake chambers 203, when the motor starts up again in the reverse direction all the hones are contracted. Now the reason for the lost motion connection between the rollers 295 and the sides of the groove 296 will be clear. It is not desired that the reciprocatory traverse should be recommended until the hones have been contracted to a substantial extent. By provision of the lost motion connection, the motor has run for an appreciable time before the valve 122 will be opened. So, therefore, when the reciprocatory traverse is recommenced, the hones have already been collapsed. But by reason of the fact that the solenoid 140 is energized, the dog 114 does not strike the lug 109 and the head 63 continues upwardly, to be finally stopped by the closing again of the valve 122 by action of the cam surface 160 on the pin 154. Then the operator would naturally pull the main reversing switch to the neutral position and press the buttons 243 inwardly to turn off the air in all of the air chambers 203 to take off the brakes and the machine is ready for the next honing operation and when a new work piece 6 has been placed in position.

It will be noted that once a honing operation has started, shutting off of the air does not completely stop the honing action but it does slow it down. The pitch of the threads on the screw shaft 184 and the angle of the cones 183 are chosen so that the honing pressure from self-action will not be too strong in order that the effect of the braking mechanism may make a real substantial difference. This, as will be seen, is a matter of selecting the pitch of the screw and the angle of the cones and in this respect the drawings should be considered merely diagrammatic.

It will be understood that boron carbide is a conductor to a slight extent. However, it is the equivalent of a resistance in the various circuits. It is advisable to leave some silver on the boron carbide movable contact member 302 which makes a good contact with the block 300. By scraping off the silver for a predetermined distance from the silvered slide 317, a known resistance is introduced into the circuit. This will not prevent the ammeters from being calibrated in terms of sizes of the bores. In fact, it is a means of adjustment for if the resistance in one circuit proves to be a little too low, more silver can be scraped off and vice versa. However, it will be understood that if desired an insulating sleeve may be provided in the block 300.

It will be noticed that the gauge means herein provided does not depend upon any purported absolute position of the work piece or of the tool or the bearing adjustments for either. Instead a direct measurement is made of the curvature of the work piece itself. If, for example, the work piece should happen to be badly out-of-round, a gauge would immediately disclose this information. In such cases the particular work piece might be set aside for reboring. It will be further observed that since boron carbide is very hard and can be brought to a high polish, no scratches will result on the surface of the work piece due to movement of the stationary contacts 301 and the movable contact 302 thereover.

It will thus be seen that there has been provided by this invention apparatus and a method in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:
1. In a honing machine, a central screw shaft, means rotatably to drive said screw shaft including means to reverse the direction of rotation, a hollow spindle surrounding said screw shaft, cage means connected to said hollow spindle supporting the honing sticks for expansion and contraction, honing stick holders mounted in said cage means for movement in a generally radial direction, nuts in contact with said screw shaft, wedge means formed on said nuts and on said holders, and a brake to retard rotation of said cage means which is driven by said screw shaft through said nuts.

2. In apparatus of the class described, a honing tool, a slide mounted in said honing tool, stationary contact members on said slide, a movable contact member between said stationary contact members whereby if a bore becomes larger the movable contact member is displaced in the slide, a flat surface on said movable contact member and a stationary flat surface, each of said surfaces being conducting, a flexible dielectric between said surfaces whereby to form a condenser unit, electric connections from said honing tool, and electrical instruments to register a change in capacity of said condensers.

3. In a honing machine, a rotative drive, a plurality of honing tools, a head mounting said honing tools, means to reciprocate said head, connections between the rotative drive and the head and the honing tools to rotate the honing tools while not reciprocating and while reciprocating, a stopping device to stop the reciprocation, and a governor connected to the rotative driving means and also connected to the device to stop the reciprocation whereby when the rotative drive is stopped the reciprocation will also stop.

4. In a honing machine, a motor, a reversing switch for said motor, a movable head, honing tool sockets journalled in said movable head, gearing including splined connections between said motor and said sockets whereby said sockets can be rotated both when the head is not reciprocating and while it is reciprocating, means to reciprocate said head including dogs to reciprocate the head in work position and means to move one dog to permit the head to be moved to a position remote from the working position, gauging means and indicating apparatus indicating the size of each bore of a work piece operated upon by said machine, a plurality of honing tools in said sockets, and individual means to regulate the pressure of said honing tools in the bores and also to start the honing action, said means acting to contract said honing tools when the reversing switch is operated.

5. In a honing machine, means for holding work having a plurality of bores to be honed, a plurality of expandable honing tools, one for each bore, means for reciprocating the tools axially of said bores, and individual means for rotating said tools to cause each to perform a honing operation upon its bore, means individual to each honing tool and operable during the drive of the tool to control the work done thereby including an inflatable friction member, and fluid means to inflate said members individually.

6. A honing machine comprising a rotatable and expansible honing tool, means to rotate the tool as a whole, means to reverse the direction of rotation of said tool, and means for controlling the expansion of said honing tool including a member movable radially of said honing tool and a member moving axially of said honing tool, said members being so related that upon rotation of the tool in one direction said members are actuated to expand the tool, and, upon rotation of the tool in the other direction, said members are actuated to contract said tool, pneumatically actuated brake means for controlling the speed of rotation of said tool in either direction, and remote control means therefor.

7. In a honing machine comprising a reciprocable and rotatable and expansible honing tool, a honing tool frame, honing stick supports mounted in said frame, for movement radially thereof, and electro-responsive means, including a stationary contact member and a radially movable contact member carried by said frame and adapted to enter the bore of a workpiece and to measure its diameter, said movable contact member being slidably mounted in a bore in said frame and having a splined connection therewith and having a surface coating of a dielectric material between it and the body of said frame.

8. In a honing machine comprising a rotatable and expansible honing tool comprising a frame and honing stick supports mounted in said frame, electro-responsive means including a stationary contact member and a radially movable contact member carried by said frame, means forming an electrical capacitance between said radially movable contact member and said frame, and means forming an electrical circuit with said capacitance and having therein a source of potential for energizing said circuit, and translating means for translating the effect in said circuit of changes in capacity of said capacitance.

9. In a honing machine having an expansible honing tool comprising a frame for supporting a number of radially movable honing sticks, an electrical circuit including a capacitance comprising as one plate thereof a member carried by said frame and movable radially thereof, a rubber disk comprising another plate of said capacitance, interposed between said member and said frame, and a layer of silver carried by said member and thus interposed between said plates, said circuit having therein a source of potential for energizing said circuit, and translating means for translating the effect in said circuit of changes in capacity of said capacitance.

10. In a honing machine, means for holding work having a plurality of bores to be honed, a plurality of expansible honing tools, one for each bore, means for rotating each of said honing tools individually, means for causing reciprocatory traverse of said honing tools in the bores of said work-piece, control means for said reciprocation causing means, and means actuated by the slowing down of the rotation of said honing tools for operating said control means to stop the reciprocatory traverse of said honing tools.

11. A honing machine comprising a head, means for reciprocating the head, a number of spindle sockets supported from said head, means for rotating the spindle sockets, a number of expandable hones supported on spindles from said sockets respectively, means individual to each hone for measuring the diameter of a work-piece bore in which it is inserted, means for simultaneously indicating the measurements made by all of the hones individually so that the operator may read and compare the sizes of the bores of a multi-bore work-piece, and control means for selectively expanding and contracting the hones individually so that the operator may bring all of the said bores to a desired diameter at the same moment.

12. A honing machine comprising a head, means for reciprocating the head, a number of spindles rotatably supported from said head, each of said spindles having adjacent its free end an expandable hone adapted to be inserted in the bore of a work-piece to be ground, means individual to each hone for measuring the diameter of the bore in which it is inserted, an indicating device having means thereon for recording the bore measurement made by each of said measuring means respectively, means for selectively expanding or collapsing the hones individually, and means for simultaneously withdrawing all of said hones from the respective bores in which they are inserted, whereby the several bores of a multi-bore work-piece may be ground simultaneously to different degrees and all of the hones withdrawn from all of the bores simultaneously when the indicating device indicates to the operator that all of the bores have attained a desired diameter.

13. A honing machine comprising a head, a number of spindles rotatably supported from said head, each of said spindles having adjacent its free end an expandable hone, and means governed by the direction and speed of rotation of said hones for controlling the expansion and contraction of said hones in the bores of a work-piece in which they are individually inserted, means individual to each hone for measuring and indicating the diameter of a bore in which the hone is inserted, means for inserting and withdrawing the said hones from the bores of said multi-bore work-piece simultaneously, and means for reversing the direction of rotation of said spindles simultaneously and for controlling the honing pressure of said hones in said bores individually for each bore whereby the operator during a given period, may grind the different bores of a work-piece to different degrees in accordance with the readings of said measuring means.

14. A honing machine comprising a head, means to reciprocate the head including dogs to reciprocate the head in work position, and means to move one dog to permit the head to be moved to a position remote from the working position, means for stopping the head in said remote position, other means operable for stopping reciprocation of the head at any time, a number of spindles rotatably supported from said head, means operable for stopping rotation of said spindles when the head is brought to a stop in said remote position, other means operable for controlling rotation of the spindles at any time, and means interconnected between said spindles and said head reciprocating means for stopping reciprocation of the head upon stopping of the rotation of said spindles.

15. A honing machine comprising a reciprocal head, a number of spindles rotatably supported from said head, means for controlling the reciprocation of the head including a displaceable member movable to change the direction of movement of said head, said displaceable member having a contact lug, three contact members movable into contact with said lug, two of said contact members serving to control the normal working reciprocating stroke by contact with said lug, means for moving one of said two contact members out of line with said lug thus permitting the head to rise beyond the normal working stroke, means for stopping the head in said position beyond the normal working stroke, means for stopping rotation of said spindles when the said head is stopped in said position beyond the normal working stroke, said third contact member serving to contact and displace the said lug upon actuation of said head from its said position beyond the normal working stroke, thereby serving to change the direction of travel of said head and to facilitate return of the head to working position.

16. A honing machine comprising a head, a number of hollow spindles each having expandable honing means supported thereon, a number of screw spindle shafts rotatably supported on said head and extending through said hollow spindles respectively, each of said screw spindle shafts having means movable axially of said shaft for expanding said honing means, means for rotating said screw spindle shafts, and means for exerting a retarding force on each of said hollow spindle shafts individually thereby causing the said means which is movable axially of the said screw spindle shaft to tend to travel on said screw spindle shaft, and thereby modifying the honing pressure of said hones individually in the bores of a workpiece in which they are inserted, remote control means for actuating said retarding force for each of said hollow spindle shafts, and remote control means for releasing the retarding force for each of said hollow spindle shafts, means for causing reciprocatory traverse of said honing means in the bores of said workpiece, means for stopping the rotation of said screw spindle shafts in one direction, and means for causing said screw spindle shafts to rotate in the opposite direction to contract each of said honing means, and a lost motion connection between said screw spindle shafts and the said means for causing the reciprocatory traverse of said honing means to prevent the recommencement of the reciprocatory traverse of said honing means after the direction of rotation thereof has been reversed, until the individual honing means have been contracted to a substantial extent.

17. A honing machine comprising a head, a number of screw spindle shafts rotatably supported on said head, means for supporting honing means mounted on each screw spindle shaft so as to permit relative movement between said screw spindle shaft and the said honing means support means with which it is associated, each of said honing means being expandable and each of said screw spindle shafts having means movable axially of said shaft for expanding the said honing means with which it is associated, means for rotating the said screw spindle shafts, and means for exerting a force tending to retard the rotation of the said support means for the said honing units individually and thereby to cause relative movement between said support means and the screw spindle shafts respectively to modify the honing pressure of said hones individually in the bores of the workpiece in which they are inserted, means for causing reciprocatory traverse of said honing means in the bores of said workpiece, means for stopping the rotation of said screw spindle shafts in one direction, and means for causing said screw spindle shafts to rotate in the opposite direction to contract each of said honing means, and a lost motion connection between said screw spindle shafts and the said means for causing the reciprocatory traverse of said honing means to prevent the recommencement of the reciprocatory traverse of said honing means after the direction of rotation thereof has been reversed, until the individual honing means have been contracted to a substantial extent.

GEORGE CROMPTON, Jr.